United States Patent
Desjoyeaux et al.

(10) Patent No.: US 12,305,592 B2
(45) Date of Patent: May 20, 2025

(54) METHOD FOR MANUFACTURING A STRUCTURE WITH CELLULAR CORES FOR A TURBOJET NACELLE

(71) Applicant: Safran Nacelles, Gonfreville l'Orcher (FR)

(72) Inventors: Bertrand Léon Marie Desjoyeaux, Moissy Cramayel (FR); Marc Versaevel, Moissy Cramayel (FR); Mathieu François Eric Preau, Moissy Cramayel (FR); Laurent Moreau, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 259 days.

(21) Appl. No.: 17/903,359

(22) Filed: Sep. 6, 2022

(65) Prior Publication Data
US 2023/0003176 A1  Jan. 5, 2023

Related U.S. Application Data

(63) Continuation of application No. PCT/FR2021/050363, filed on Mar. 3, 2021.

(30) Foreign Application Priority Data

Mar. 4, 2020  (FR) ...................... 2002198

(51) Int. Cl.
*F02K 1/82* (2006.01)
*B32B 3/12* (2006.01)
(Continued)

(52) U.S. Cl.
CPC .............. *F02K 1/827* (2013.01); *B64D 33/02* (2013.01); *B64D 2033/0206* (2013.01);
(Continued)

(58) Field of Classification Search
CPC . F02K 1/827; F02K 1/82; F02C 7/045; B64D 2033/0206; B64D 33/02;
(Continued)

(56) References Cited

U.S. PATENT DOCUMENTS 3,853,681 A * 12/1974 Kehr ...................... C08G 75/12
  522/90
3,952,831 A *  4/1976 Bernard ............... G10K 11/172
  181/292

(Continued)

FOREIGN PATENT DOCUMENTS

FR     3088658 A1 *  5/2020  ........... B32B 15/043
GB     1470036        4/1977
WO  WO-2019043344 A1 *  3/2019  ............. B32B 15/04

OTHER PUBLICATIONS

International Search Report issued in corresponding International Application PCT/FR2021/050363, mailed May 26, 2021.

*Primary Examiner* — Edgardo San Martin
(74) *Attorney, Agent, or Firm* — Burris Law, PLLC

(57) ABSTRACT

A method for manufacturing an alveolar core structure includes at least one cell including a secondary duct having a first end defining a sound wave inlet, and an opposite second end, the secondary duct comprising a sound wave outlet. The method also includes a fastening step in which adhesive tapes transverse to the longitudinal direction of said first plate are applied on a first longitudinal plate. The secondary duct in the form of a flattened element is fastened, on the first plate, by gluing at its sound wave inlet. A second plate is applied. A step of deploying the first and second plates so as to form the peripheral wall of the cells and so that the flattened element is deployed.

19 Claims, 3 Drawing Sheets

(51) Int. Cl.
  *B32B 7/14* (2006.01)
  *B32B 37/02* (2006.01)
  *B64D 33/02* (2006.01)
  *F02C 7/045* (2006.01)
  *G10K 11/172* (2006.01)
(52) U.S. Cl.
  CPC .. *F05D 2250/283* (2013.01); *F05D 2260/963* (2013.01); *F05D 2300/121* (2013.01); *F05D 2300/603* (2013.01)
(58) Field of Classification Search
  CPC .......... F05D 2250/283; F05D 2250/28; F05D 2260/963; F05D 2260/96; G10K 11/172; G10K 11/168; G10K 11/02; B32B 3/12; B32B 7/12; B32B 7/14; B32B 37/00; B32B 37/1284; B32B 37/1292; B32B 37/0076; B32B 37/02; B29D 24/005
  See application file for complete search history.

(56) References Cited

U.S. PATENT DOCUMENTS

| | | | | |
|---|---|---|---|---|
| 4,118,263 | A * | 10/1978 | Cook, Jr. ............ | B29C 65/5071 428/116 |
| 5,228,936 | A * | 7/1993 | Goodhue .......... | B29C 66/83413 156/197 |
| 5,760,349 | A * | 6/1998 | Borchers ................ | F41B 15/08 181/293 |
| 6,245,408 | B1 * | 6/2001 | Bitzer .................... | F16F 7/121 428/118 |
| 6,274,216 | B1 * | 8/2001 | Gonidec .................. | B32B 5/02 428/116 |
| 8,245,815 | B2 * | 8/2012 | Valleroy ................ | B32B 3/266 181/290 |
| 8,408,358 | B1 * | 4/2013 | Hermiller ............... | F02K 1/827 181/293 |
| 8,689,936 | B2 * | 4/2014 | Richter ................ | G10K 11/172 52/145 |
| 8,997,923 | B2 * | 4/2015 | Ichihashi ................ | F02C 7/045 181/292 |
| 9,068,345 | B2 * | 6/2015 | Ichihashi ............. | G10K 11/172 |
| 9,390,704 | B2 * | 7/2016 | Hurlin ................... | B64D 33/02 |
| 9,469,985 | B1 * | 10/2016 | Ichihashi ................ | E04B 1/84 |
| 10,167,583 | B2 * | 1/2019 | Witte ...................... | B32B 5/26 |
| 10,280,839 | B2 * | 5/2019 | Riou ....................... | F02C 7/045 |
| 10,808,399 | B2 * | 10/2020 | Alstad ................... | E04B 2/7409 |
| 10,851,713 | B2 * | 12/2020 | Roach .................... | B64D 29/00 |
| 11,208,193 | B2 * | 12/2021 | Ravise ................ | G10K 11/168 |
| 11,292,206 | B2 * | 4/2022 | Wilde ....................... | B32B 3/12 |
| 11,686,247 | B2 * | 6/2023 | Desjoyeaux .......... | F04D 29/665 415/119 |
| 11,715,450 | B2 * | 8/2023 | Quesada ............... | G10K 11/168 181/284 |
| 11,945,596 | B2 * | 4/2024 | Porte ....................... | B29C 66/47 |
| 12,014,714 | B2 * | 6/2024 | Porte ........................ | B64C 1/40 |
| 2013/0052398 | A1 | 2/2013 | Dean et al. | |
| 2015/0041247 | A1 | 2/2015 | Ichihashi | |
| 2020/0063691 | A1 * | 2/2020 | Kruckenberg ............ | B32B 3/12 |
| 2021/0277829 | A1 * | 9/2021 | Van Ness ............... | F04D 29/665 |
| 2021/0390940 | A1 * | 12/2021 | Desjoyeaux ............ | B32B 27/12 |
| 2022/0199064 | A1 * | 6/2022 | Quesada ................ | G10K 11/168 |
| 2022/0293077 | A1 * | 9/2022 | Ravise .................... | F02C 7/045 |

* cited by examiner

METHOD FOR MANUFACTURING A STRUCTURE WITH CELLULAR CORES FOR A TURBOJET NACELLE

CROSS-REFERENCE TO RELATED APPLICATIONS

This application is a continuation of International Application No. PCT/FR2021/050363, filed on Mar. 3, 2021, which claims priority to and the benefit of FR 2002198, filed on Mar. 4, 2020. The disclosures of the above applications are incorporated herein by reference.

FIELD

The present disclosure relates to a method for manufacturing an alveolar core structure adapted to be used in an acoustic attenuation panel such as, for example, an acoustic attenuation panel of a turbojet engine nacelle. The present disclosure also concerns an alveolar core structure thus obtained, and an acoustic attenuation panel and a nacelle including such an alveolar core structure.

BACKGROUND

The statements in this section merely provide background information related to the present disclosure and may not constitute prior art.

An aircraft is propelled by one or several propulsion unit(s) each comprising a turbojet engine housed within a nacelle. Each propulsion unit is attached to the aircraft by a mast generally located below or over a wing or at the fuselage of the aircraft.

A nacelle generally has a tubular structure comprising an air inlet upstream of the turbojet engine, a middle section intended to surround a fan of the turbojet engine, a downstream section which can accommodate thrust reversal means and intended to surround the combustion chamber of the turbojet engine, and generally terminates in an ejection nozzle whose outlet is located downstream of the turbojet engine.

Turbojet engines generate significant noise pollution. To address this noise pollution, acoustic-type structures including a so-called acoustic or resistive, air-permeable front skin, and a so-called solid, air-impermeable rear skin are disposed along surfaces guiding the air flows of the turbojet engine. An alveolar core comprising cells is disposed between these two skins, and fastened to at least one of the two skins. In this type of acoustic structure, the acoustic skin is arranged opposite the sound source to be attenuated, and it has perforations to enable the passage of sound waves through the acoustic skin, so that the sound wave penetrates into the cells of the alveolar core. Each cell extends along a longitudinal main axis corresponding to a noise propagation axis. The length of the cells allows determining the frequency at which the acoustic attenuation of the cells is maximum. Typically, an alveolar core with a 30 millimeter thickness is adapted to attenuate frequencies close to 2000 Hertz, and an alveolar core with a 70 millimeter thickness is adapted to attenuate frequencies close to 880 Hertz.

In a known manner, according to a so-called "Honeycomb" structure technique, an alveolar core is generally obtained by superimposing several light alloy or composite metal sheets between which gluing means, which cause the sheets to adhere to each other in some points, called nodal areas, are punctually disposed. The alveolar core structure thus produced is considered to be in a compacted form. In order to form the alveolar cells, the structure in a compacted form undergoes a stretching so as to separate the sheets which remain joined together at the nodal areas. The alveolar core structure thus produced is considered to be in an expanded form.

The length of the cells allows determining the frequency at which the acoustic attenuation of the cells is maximum. Typically, an alveolar core with a 30 millimeter thickness is adapted to attenuate frequencies close to 2000 Hertz, and an alveolar core with a 70 millimeter thickness is adapted to attenuate frequencies close to 880 Hertz.

To acoustically attenuate low sound frequencies, and limit the thickness of the acoustic cells, it is known to dispose an obstacle in the acoustic cells, so as to increase the length of the path traveled by the sound waves through the cell.

Such an obstacle is, for example, a cone, open at its base and including a second opening defining a separation between two ducts in the acoustic cell and a communication neck between these two ducts for circulating the sound wave. By providing for such cones, the average frequency effectively attenuated by the acoustic system is lowered, yet without increasing the thickness of the acoustic structure.

These cones are placed in the alveolar core structure, in particular by welding.

The manufacture of these cones inside the alveolar cells is thus extremely complex, and the time required for the manufacture of the alveolar core structure is very long. Also, an alveolar core structure manufactured by this type of prior art method is very expensive.

SUMMARY

The present disclosure provides a method for manufacturing an alveolar core structure for an acoustic attenuation panel. The alveolar core structure includes a plurality of adjoining acoustic cells which form the alveolar core, each acoustic cell extending along a main axis corresponding to an axis of propagation of a sound wave, from a front end up to a rear end, and being delimited by a peripheral wall defining a primary duct for circulating the sound wave, at least one cell including a secondary duct for circulating the sound wave, the secondary duct comprising a secondary duct wall having a first end proximal to the front end of the cell, the first end defining a sound wave inlet, and an opposite second end, the secondary duct comprising a sound wave outlet located near the rear end of the cell. The method comprises a fastening step in which adhesive tapes parallel to each other and transverse to the longitudinal direction of said first plate are applied, on a first longitudinal plate, so as to form nodal areas. The secondary duct in the form of a flattened element is fastened, on the first plate between two nodal areas, by gluing at its sound wave inlet. A second plate is applied so that it is fastened by gluing to the nodal areas, and to the flattened element at the wave inlet. A deployment step in which the first and second plates are moved away from one another so as to form the peripheral wall of the cells and so that the flattened element is deployed to form the secondary duct.

Thus, the step of fastening the secondary duct is carried out at ground level, which simplifies the manufacturing method and thus reduces costs. Following the fastening step, an unexpanded block, also called an unexpanded honeycomb block, is obtained.

As used herein, "adhesive tape" should be understood to mean any gluing means, such as a film of glue or any other sticky element.

The secondary duct is a sound wave guide.

The nodal areas correspond to the junction areas between the first and second plates to form the peripheral walls of the cells.

The flattened element is shaped as at least one secondary duct in a flattened form of an acoustic cell.

According to other features of the present disclosure, the method includes one or more of the following optional features considered alone or according to all possible combinations.

In the deployed form of the alveolar core, when cut to the desired thickness, the secondary duct is characterized in that it is glued along a perimeter of attachment to the walls of the cell delimited by two nodal areas between two plates. In addition, it includes in the portion not glued to the walls of the cell, at least one orifice so as to constitute a connection neck between the primary duct and the secondary duct.

The non-glued portion has a perimeter smaller than the attachment perimeter.

According to one feature, the fastening step is repeated by alternating the positions of the nodal areas, so as to obtain several superimposed layers of flattened elements between the first and second plates, before the deployment step.

According to this feature, the second plate serves as a second plate for one layer and as a first plate for another adjacent layer.

According to one feature, the deployment step is preceded by a consolidation step during which the adhesive tapes are polymerized organic tapes.

According to one feature, at least two adjoining cells include a secondary duct for circulating the sound wave, said secondary circuits being fastened to the first plate in a flattened form while being linked to each other by their wall at their wave inlet.

According to one feature, the flattened element is shaped as two flattened secondary ducts, linked by their respective sound wave inlet.

Thus, during the fastening step, between two nodal areas, a flattened element shaped as first and second flattened secondary ducts, linked by their sound wave inlet, is fastened before applying the second plate, so as to obtain a substantially flat assembly, comprising the first plate, the second plate and the flattened element.

According to this feature, the method includes a step of cutting, transversely to the longitudinal direction of the first and second plates, so as to separate the flattened element to form two distinct assemblies, one including a first secondary duct and the other including a second secondary duct.

In one form, this cutting step is carried out by machining after the deployment step.

Alternatively, the cutting step is carried out before the deployment step.

According to this feature, the deployment step is carried out separately for each substantially flat assembly including a flattened secondary duct.

According to one feature, the cells have a larger dimension comprised between 3 and 50 mm.

According to one feature, the nodal areas are spaced apart by a distance comprised between 3 and 100 mm and, in one form, between 4 and 75 mm.

According to one feature, the perimeter of attachment of the secondary duct to the walls of the cell is comprised between 9 and 300 mm.

According to one feature, the nodal areas are spaced apart by a variable distance comprised between 3 and 100 mm.

According to one feature, the flattened element has a flattened conical or frustoconical shape so that the secondary duct has a conical or frustoconical shape.

Alternatively, the flattened element has a diabolo, an ogive-like or a flattened semi-circle shape, so that the secondary duct has a diabolo, an ogive-like or a semi-circle shape.

According to one feature, the wave outlet of the secondary duct has a diameter smaller than that of the wave inlet.

According to one feature, the wave outlet of the secondary circuit is disposed in the wall of the secondary duct, in its rear half, that is to say proximal to the rear end of the cell.

According to one feature, the acoustic cells have a deployable polygonal shape (for example, pentagonal or hexagonal).

According to this feature, the first and second plates have folds intended to delimit edges to obtain polygonal acoustic cells during the deployment step.

In addition, the flattened element has folds intended to delimit edges to obtain a polygonal conical or frustoconical-shaped secondary duct.

According to one feature, the acoustic cells have flat or corrugated peripheral walls.

According to one feature, the wave outlet of the secondary circuit is circular in shape.

According to one feature, the constituent material of the first and second plates is an aluminum alloy.

According to one feature, the constituent material of the secondary duct is an organic material, in one form selected from the groups of thermoplastics, such as, for example, PEI PEEK, PI, Polyester, PA.

According to one feature, the constituent material of the first and second plates is a composite material such as a phenolic, epoxy, bismaleideimide (BMI) or polyimide matrix material and including fibers such as glass fibers, or aramid fibers, such as fibers registered under the trademark Nomex® or Kevlar®.

According to another feature, the constituent material of the first and second plates is a composite material of the family of so-called ceramic materials, based on carbon fibers or SiC or aluminized oxides, and having a ceramic matrix such as geopolymers, Sic or aluminized oxides.

The present disclosure further concerns an alveolar core structure obtained according to the method as previously described, comprising at least one acoustic cell extending along a main axis corresponding to an axis of propagation of a sound wave, from a front end up to a rear end, and being delimited by a peripheral wall defining a primary duct for circulating the sound wave. The cell includes a secondary duct for circulating the sound wave, the secondary duct comprises a secondary duct wall, having a first end proximal to the front end of the cell, the first end defining a sound wave inlet, and an opposite second end, the secondary duct comprises a sound wave outlet located close to the rear end of the cell.

According to one feature, the sound wave outlet of the secondary duct has a diameter smaller than that of the sound wave inlet.

According to one feature, the sound wave outlet of the secondary circuit is disposed at the distal end of the secondary duct.

According to one feature, the sound wave outlet of the secondary circuit is disposed in the wall of the secondary duct, in its rear half, that is to say proximal to the rear end of the cell.

According to one feature, the sound wave outlet of the secondary circuit is circular in shape.

The present disclosure further concerns an acoustic panel comprising an alveolar core structure obtained according to the method as previously described.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
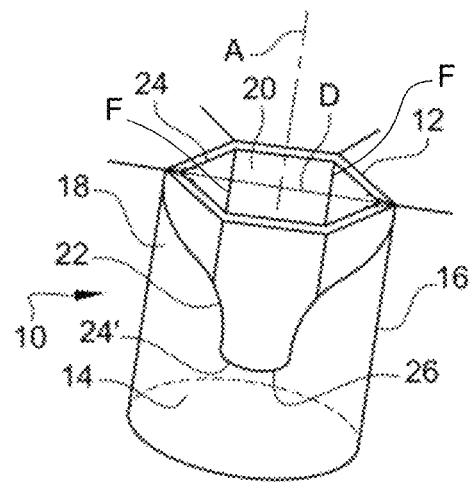
FIG. 1 is a schematic perspective view of a first form of an acoustic cell obtained according to the method of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, the terms "front", "rear", "horizontal", "vertical", "upper", "lower", etc. will be used in a non-limiting manner and with reference to the drawings in order to facilitate the description.

Figure 2:
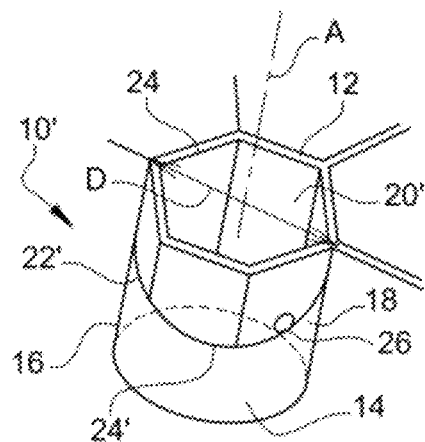
FIG. 2 is a schematic perspective view of a second form of an acoustic cell obtained according to the method of the present disclosure.

FIGS. 1 and 2 represent acoustic cells 10, 10' of an alveolar core structure for an acoustic attenuation panel, according to variations of the present disclosure. The acoustic cells 10, 10' extend along a main axis A. The main axis A corresponds to an axis of propagation of a sound wave, so that the alveolar core structure allows attenuating the sound wave. More specifically, the acoustic cells 10, 10' include a so-called front end 12, and a so-called rear end 14 opposite to the front end 12. The acoustic cells 10, 10' are delimited by a peripheral wall 16 defining a duct 18, called a primary duct. The primary duct 18 is a duct for circulating the sound wave.

The acoustic cells can have a deployable polygonal shape, for example a hexagonal shape.

The peripheral wall 16 can be flat. It can be made of an aluminum alloy or a composite material such as a phenolic, epoxy, bismaleideimide (BMI) or polyimide matrix material and including fibers such as glass fibers, aramid fibers such as those registered under the trademark Nomex® or Kevlar®, or of a composite material of the family of the so-called ceramic materials, based on carbon fibers or SiC or aluminized oxides, and having a ceramic matrix such as geopolymers, Sic or aluminized oxides.

In a variant that is not shown, the acoustic cells have corrugated peripheral walls.

As illustrated in FIG. 1, the acoustic cell 10 has a secondary duct 20 comprising a frustoconical-shaped secondary duct wall 22. In addition, the secondary duct 20 may have a polygonal shape.

Alternatively, as illustrated in FIG. 2, the acoustic cell 10' has a secondary duct 20' comprising an ogive-shaped secondary duct wall 22'.

In variants that are not shown, the duct wall has other shapes such as conical or frustoconical or semi-circular shapes.

The secondary ducts 20, 20' comprise a first end 24 proximal to the front end 12 of the acoustic cell, and an opposite second end 24'. The first end 24 defines an opening corresponding to a sound wave inlet. Further, the secondary ducts comprise another opening 26 corresponding to a sound wave outlet.

In the form shown in FIG. 1, the sound wave outlet 26 is disposed at the second end 24' of the secondary duct 20.

In the form shown in FIG. 2, the sound wave outlet 26 is disposed in the wall 22' of the secondary duct 20', near the second end 24'.

The sound wave inlet 24 is located at the front end 12 of the acoustic cell 10, 10', while the sound wave outlet 26 is located near the rear end 14 of the acoustic cell 10, 10'. The sound wave outlet 26 may have a diameter smaller than that of the sound wave inlet 24. It can be circular in shape.

The cells 10, 10' can have a maximum dimension D in the range of 20 mm.

The constituent material of the secondary ducts 20, 20' can be an organic material, in one form selected from the groups of thermoplastics, such as, for example, PEI PEEK, PI, Polyester, PA.

Figure 3:
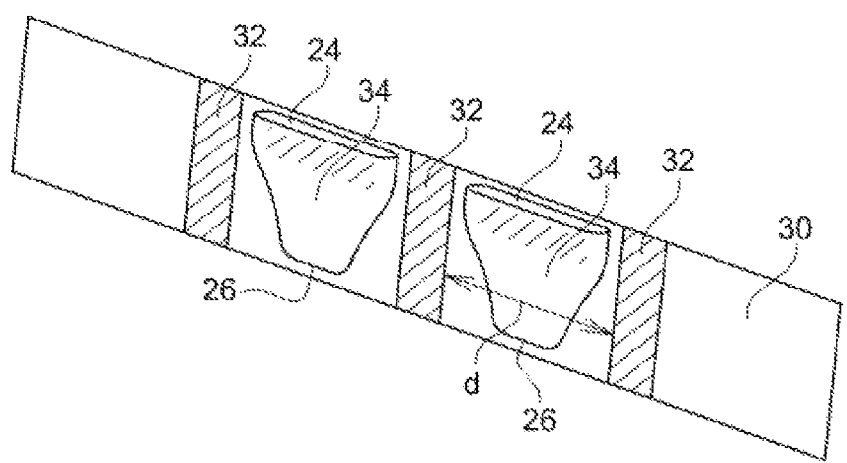
FIG. 3 is a schematic perspective view illustrating a first step of the method according to another form of the present disclosure.
Figure 4:
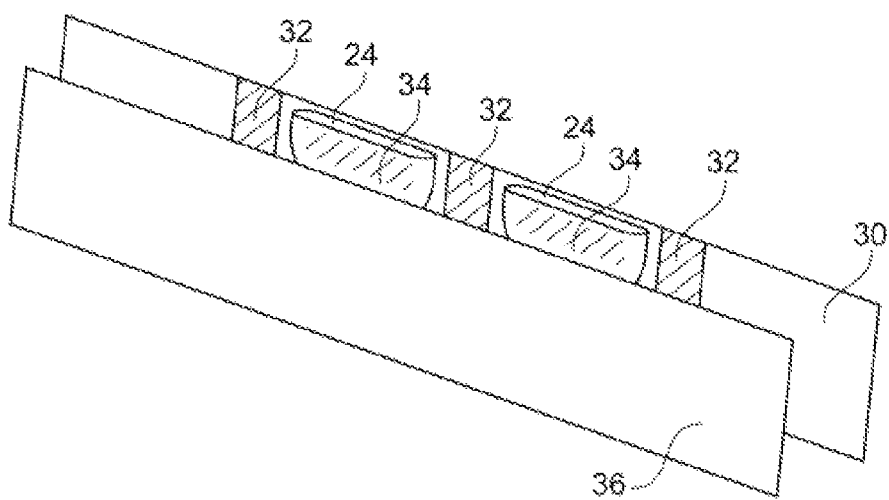
FIG. 4 is a schematic perspective view illustrating a second step of the method of the present disclosure according to FIG. 3.
Figure 5:
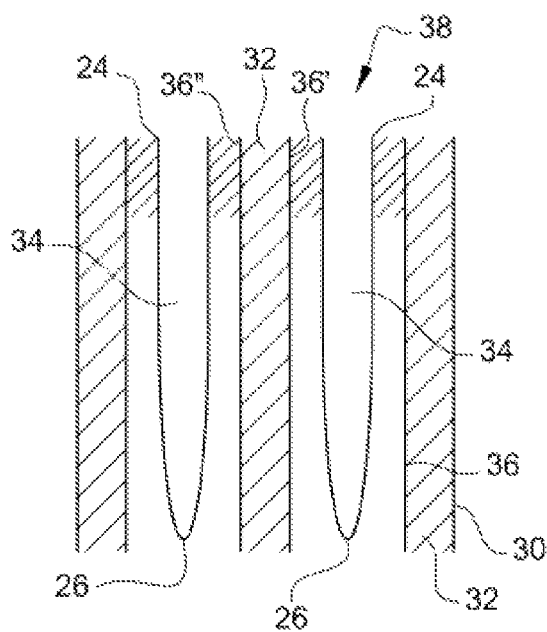
FIG. 5 is a schematic cross-sectional view illustrating an unexpanded block obtained during the fastening step of the method of yet another form of the present disclosure.

FIGS. 3 to 5 illustrate a method for manufacturing an alveolar core structure for a sound attenuation panel, according to one form of the present disclosure, comprising acoustic cells as previously described.

This method comprises a so-called fastening step in which a first longitudinal plate 30 is provided, on which a plurality of adhesive tapes 32 parallel to each other and transverse to the longitudinal direction of the first plate 30 are applied.

During this fastening step, a flattened element 34 shaped as a secondary duct 20, in a flattened form, of an acoustic cell 10 is also provided.

As illustrated in FIGS. 3 to 5, two elements 34 are provided so as to form two acoustic cells. However, a multitude of elements 34 can be provided, so as to form a multitude of acoustic cells.

The element 34 comprises a wall corresponding to the wall 22 of the secondary duct, a so-called front opening corresponding to the sound wave inlet 24 and a so-called rear opening corresponding to the sound wave outlet 26.

The element 34 can be fastened by gluing on the first plate 30 between two adhesive tapes 32. More particularly, the element 34 can be fastened by gluing on the first plate 30, at its sound wave inlet 24. The sound wave outlet 26 of the element 34 is disposed in a non-glued portion of the element 34.

In this form of the present disclosure, the elements 34 are fastened by gluing between two adhesive tapes so as to allow forming two adjoining acoustic cells.

Finally, during this fastening step, a second plate 36 is applied on the first plate 30, so as to sandwich the element 34. The second plate 36 can be fastened by gluing on the adhesive tapes 32 and on the element 34 at its sound wave inlet 24. A substantially flat assembly, comprising the first plate 30, the second plate 36 and the element 34, is then obtained.

The adhesive tapes 32 correspond to nodal areas, that is to say junction areas between the first 30 and second 36 plates.

Then, the method comprises a deployment step in which the first 30 and second 36 plates are moved away from one another so as to deploy the element 34 to form the secondary duct 20. The first 30 and second 36 plates glued at the nodal areas correspond to the peripheral wall 16 of the acoustic cells 10. Thus, the adhesive tapes 32 allow forming the peripheral walls of the acoustic cells. During the deployment step, the first 30 and second 36 plates are moved away so as to form the primary duct 18 of the acoustic cells.

Before the deployment step, the fastening step can be reproduced on the second plate 36, so as to obtain a superposition of plates 30, 36, 36', 36" (FIG. 5) which sandwich elements 34 corresponding to flattened secondary ducts. From one plate to another, the elements 34 may be disposed in a staggered way. An unexpanded block 38, also called an unexpanded honeycomb block, is obtained.

The non-glued portion of the element 34 may have a perimeter smaller than the perimeter of the glued portion, called an attachment perimeter. The attachment perimeter can be in the range of 150 mm.

The adhesive tapes 32 can be any gluing means such as glue films or any other sticky element.

In one form, the adhesive tapes 32 are organic tapes that are polymerized prior to the deployment step. This polymerization step is called the consolidation step.

The adhesive tapes 32 can be spaced apart by a distance d of about 50 mm.

In one form, the spacing distance d between two adhesive tapes is variable along a plate.

The first 30 and second 36 plates may have folds F intended to delimit the edges of the acoustic cells so as to obtain polygonal acoustic cells such as hexagonal cells.

In addition, the element 34 may have folds intended to delimit edges to form a polygonal secondary duct.

The constituent material of the first 30 and second 36 plates may be an aluminum alloy, so as to form acoustic cell peripheral walls made of aluminum alloy.

Alternatively, the constituent material of the first 30 and second 36 plates can be:

a composite material such as a phenolic, epoxy, bismaleideimide (BMI) or polyimide matrix material and including fibers such as glass fibers, aramid fibers such as those registered under the trademark Nomex® or Kevlar®, or a composite material of the family of so-called ceramic materials, based on carbon fibers or SiC or aluminized oxides, and having a ceramic matrix such as geopolymers, Sic or aluminized oxides, so as to form acoustic cell peripheral walls in one of these materials.

The constituent material of the element 34 can be an organic material, in one form selected from the groups of thermoplastics, such as, for example, PEI PEEK, PI, Polyester, PA, so as to form acoustic cell secondary ducts made of an organic material.

Figure 6:
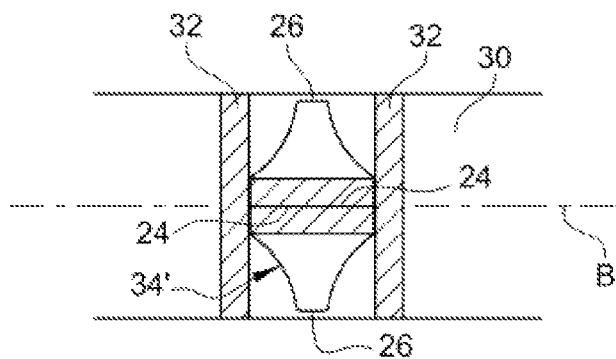
FIG. 6 is a schematic view illustrating one variant of the method of the present disclosure illustrated in FIG. 3.

As illustrated in FIG. 6, during the fastening step, an element 34' shaped as two flattened secondary ducts, linked by their sound wave inlet 24, is provided. As illustrated in FIGS. 3 to 5, this element 34' can be fastened by gluing on the first plate 30, between two adhesive tapes 32, at the sound wave inlets 24, then a second plate 36 is applied on the first plate 30, so as to sandwich this element 34'.

In FIG. 6, the method includes a step of cutting along an axis B transverse to the longitudinal direction of the plates, so as to separate the element 34' to form two distinct assemblies, one of which includes a flattened element corresponding to a secondary duct and the other includes another flattened element corresponding to a secondary duct.

This cutting step can be carried out before the deployment step.

Alternatively, this cutting step can be carried out after the deployment step, by machining.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing an alveolar core structure for an acoustic attenuation panel, the alveolar core structure including a plurality of adjoining acoustic cells which form the alveolar core, each acoustic cell extending along a main axis (A) corresponding to an axis of propagation of a sound wave, from a front end up to a rear end, and being delimited by a peripheral wall defining a primary duct for circulating the sound wave, at least one cell including a secondary duct for circulating the sound wave, the secondary duct comprising a secondary duct wall, having a first end proximal to the front end of the cell, the first end defining a sound wave inlet, and an opposite second end, the secondary duct comprising a sound wave outlet located near the rear end of the cell, the method comprising:

a fastening step in which:

adhesive tapes parallel to each other and transverse to a longitudinal direction of said first plate are applied, on a first longitudinal plate, so as to form nodal areas, the secondary duct in the form of a flattened element is fastened, on the first plate between two nodal areas, by gluing at the sound wave inlet, and a second plate is applied and fastened by gluing to the nodal areas, and to the flattened element at the sound wave inlet; and a deployment step in which the first and second plates are moved away from one another so as to form the peripheral wall of the cells and so that the flattened element is deployed to form the secondary duct, wherein the secondary duct is glued along an entire perimeter to the walls of the cell delimited by the two nodal areas between the first plate and the second plate.

2. The method according to claim 1, wherein the fastening step is repeated by alternating positions of the nodal areas, so as to obtain several superimposed layers of flattened elements between first and second plates, before the deployment step.

3. The method according to claim 1, wherein the flattened element is shaped as two flattened secondary ducts, linked by their respective sound wave inlet.

4. The method according to claim 3, further comprising a step of cutting, transversely to the longitudinal direction of the first and second plates, so as to separate the flattened element to form two distinct assemblies, one including a first secondary duct and the other including a second secondary duct.

5. The method according to claim 4, wherein the cutting step is carried out by machining after the deployment step.

6. The method according to claim 4, wherein the cutting step is carried out before the deployment step.

7. The method according to claim 1, wherein the flattened element has one of a flattened conical and a frustoconical shape so that the secondary duct has the one of a conical and a frustoconical shape.

8. The method according to claim 1, wherein the first and second plates have folds intended to delimit edges to obtain polygonal acoustic cells during the deployment step.

9. The method according to claim 8, wherein the flattened element has folds intended to delimit edges to obtain one of a polygonal conical and a frustoconical-shaped secondary duct.

10. The method according to claim 1, wherein a constituent material of the first and second plates is an aluminum alloy.

11. The method according to claim 1, wherein a constituent material of the first and second plates is a composite material.

12. The method according to claim 11, wherein the composite material includes fibers selected from the group consisting of glass fibers and aramid, and the constituent material of the secondary duct is a thermoplastic material.

13. An alveolar core structure obtained according to the method of claim 1, comprising at least one acoustic cell extending along a main axis corresponding to an axis of propagation of a sound wave, from a front end up to a rear end, and being delimited by a peripheral wall defining a primary duct for circulating the sound wave, the cell including a secondary duct for circulating the sound wave, the secondary duct comprising a secondary duct wall, having a first end proximal to the front end of the cell, the first end defining a sound wave inlet, and an opposite second end, the secondary duct comprising a sound wave outlet located near the rear end of the cell.

14. The alveolar core structure according to claim 13, wherein the sound wave outlet of the secondary duct has a diameter smaller than that of the sound wave inlet.

15. The alveolar core structure according to claim 13, wherein the sound wave outlet of a secondary circuit is disposed at a distal end of the secondary duct.

16. The alveolar core structure according to claim 13, wherein the sound wave outlet of a secondary circuit is disposed in the wall of the secondary duct, in its rear half, that is to say proximal to the rear end of the cell.

17. The alveolar core structure according to claim 13, wherein the sound wave outlet of a secondary circuit is circular in shape.

18. A method for manufacturing an alveolar core structure for an acoustic attenuation panel, the alveolar core structure including a plurality of adjoining acoustic cells which form the alveolar core, each acoustic cell extending along a main axis (A) corresponding to an axis of propagation of a sound wave, from a front end up to a rear end, and being delimited by a peripheral wall defining a primary duct for circulating the sound wave, at least one cell including a secondary duct for circulating the sound wave, the secondary duct comprising a secondary duct wall, having a first end proximal to the front end of the cell, the first end defining a sound wave inlet, and an opposite second end, the secondary duct comprising a sound wave outlet located near the rear end of the cell, the method comprising:

a fastening step in which:
adhesive tapes parallel to each other and transverse to a longitudinal direction of said first plate are applied, on a first longitudinal plate, so as to form nodal areas,
the secondary duct in the form of a flattened element is fastened, on the first plate between two nodal areas, by gluing at the sound wave inlet, the flattened element having folds intended to delimit edges to obtain one of a polygonal conical and a frustoconical-shaped secondary duct;
a second plate is applied and fastened by gluing to the nodal areas, and to the flattened element at the sound wave inlet; and
a deployment step in which the first and second plates are moved away from one another so as to form the peripheral wall of the cells and so that the flattened element is deployed to form the secondary duct.

19. A method for manufacturing an alveolar core structure for an acoustic attenuation panel, the alveolar core structure including a plurality of adjoining acoustic cells which form the alveolar core, each acoustic cell extending along a main axis (A) corresponding to an axis of propagation of a sound wave, from a front end up to a rear end, and being delimited by a peripheral wall defining a primary duct for circulating the sound wave, at least one cell including a secondary duct for circulating the sound wave, the secondary duct comprising a secondary duct wall, having a first end proximal to the front end of the cell, the first end defining a sound wave inlet, and an opposite second end, the secondary duct comprising a sound wave outlet located near the rear end of the cell, the method comprising:

a fastening step in which:
adhesive tapes parallel to each other and transverse to a longitudinal direction of said first plate are applied, on a first longitudinal plate, so as to form nodal areas,
the secondary duct in the form of a flattened element is fastened, on the first plate between two nodal areas, by gluing at the sound wave inlet, the flattened element having folds intended to delimit edges to obtain one of a polygonal conical and a frustoconical-shaped secondary duct;
a second plate is applied and fastened by gluing to the nodal areas, and to the flattened element at the sound wave inlet; and
a deployment step in which the first and second plates are moved away from one another so as to form the peripheral wall of the cells and so that the flattened element is deployed to form the secondary duct, wherein the secondary duct is glued along an entire perimeter to the walls of the cell delimited by the two nodal areas between the first plate and the second plate.

\* \* \* \* \*